(12) United States Patent
Portela Mata et al.

(10) Patent No.: US 9,776,396 B2
(45) Date of Patent: Oct. 3, 2017

(54) TESTING A PRINTHEAD (71) Applicant: HEWLETT-PACKARD DEVELOPMENT COMPANY, L.P., Houston, TX (US)

(72) Inventors: Laura Portela Mata, Sant Cugat del Valles (ES); David Soriano Fosas, Terrassa (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/596,600

(22) Filed: May 16, 2017

(65) Prior Publication Data

US 2017/0246857 A1    Aug. 31, 2017

Related U.S. Application Data

(63) Continuation of application No. 15/349,520, filed on Nov. 11, 2016, which is a continuation of application No. 14/760,417, filed as application No. PCT/US2013/022664 on Jan. 23, 2013, now Pat. No. 9,527,276.

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .... B41J 29/393; B41J 2/2142; B41J 2/16579; B41J 2/2146; B41J 2/0451; B41J 2/04561; B41J 2029/3935; B41J 2/2139; B41J 2202/17; B41J 2/165; B41J 2/07; B41J 2/14153; B41J 2/515
See application file for complete search history.

(56) References Cited

U.S. PATENT DOCUMENTS

| | | | |
|---|---|---|---|
| 5,808,637 | A | 9/1998 | Wenzel et al. |
| 6,568,786 | B2 | 5/2003 | Sarmast |
| 6,641,246 | B2 | 11/2003 | Endo et al. |
| 6,767,088 | B2 | 7/2004 | Sarmast |
| 7,004,571 | B2 | 2/2006 | Garbacz et al. |
| 8,029,091 | B2 | 10/2011 | Kato |

(Continued)

FOREIGN PATENT DOCUMENTS

| | | |
|---|---|---|
| CN | 1939730 | 4/2007 |
| CN | 101148119 | 3/2008 |

(Continued)

OTHER PUBLICATIONS

International Searching Authority, The International Search Report and the Written Opinion, dated Sep. 27, 2013, 10 Pages.

(Continued)

*Primary Examiner* — Thinh H Nguyen
(74) *Attorney, Agent, or Firm* — HP Inc.—Patent Department (57) ABSTRACT

A system and method for testing printheads is disclosed. The system comprises an optical sensor mounted on a movable carriage. The optical sensor is moved past a nozzle to be tested on the printhead while the nozzle ejects ink. The output signal of the optical sensor can be used to determine when the trajectory of the ejected ink is improper.

20 Claims, 8 Drawing Sheets

(56) References Cited

U.S. PATENT DOCUMENTS

| 8,172,356 | B2 * | 5/2012 | Portela | ............... | B41J 2/125 |
| | | | | | 347/19 |
| 2004/0119779 | A1 | 6/2004 | Elgee | | |
| 2005/0219286 | A1 | 10/2005 | Nagashima | | |
| 2006/0279601 | A1 | 12/2006 | Unosawa | | |
| 2007/0064041 | A1 | 3/2007 | Sugahara | | |
| 2012/0182362 | A1 | 7/2012 | Odin | | |

FOREIGN PATENT DOCUMENTS

| CN | 102202893 | 9/2011 |
| CN | 102637616 | 8/2012 |
| JP | H08-118679 | 5/1996 |
| JP | 2000-015845 | 1/2000 |
| JP | 2005212267 | 8/2005 |
| JP | 2006044000 | 2/2006 |
| JP | 2007112124 | 5/2007 |
| JP | 2012-192552 | 10/2012 |

OTHER PUBLICATIONS

Kwon, K-S., "Methods for Detecting Air Bubble in Piezo Inkjet Dispensers", Jun. 25, 2009, pp. 50-56, vol. 153; Issue: 1, http://144.206.159.178/ft/943/607048/12603461.pdf.

\* cited by examiner

TESTING A PRINTHEAD

BACKGROUND

Inkjet printers print images onto media by ejecting ink drops from a printhead. Each printhead typically has an array of nozzles that eject the ink drops onto the media. When a nozzle is plugged or incorrectly ejects the ink drops to a different position on the media, the image quality of the printed output may degrade. With the increase in the number of nozzles per printhead, detecting improperly functioning nozzles has become more difficult.

DETAILED DESCRIPTION

Figure 1:
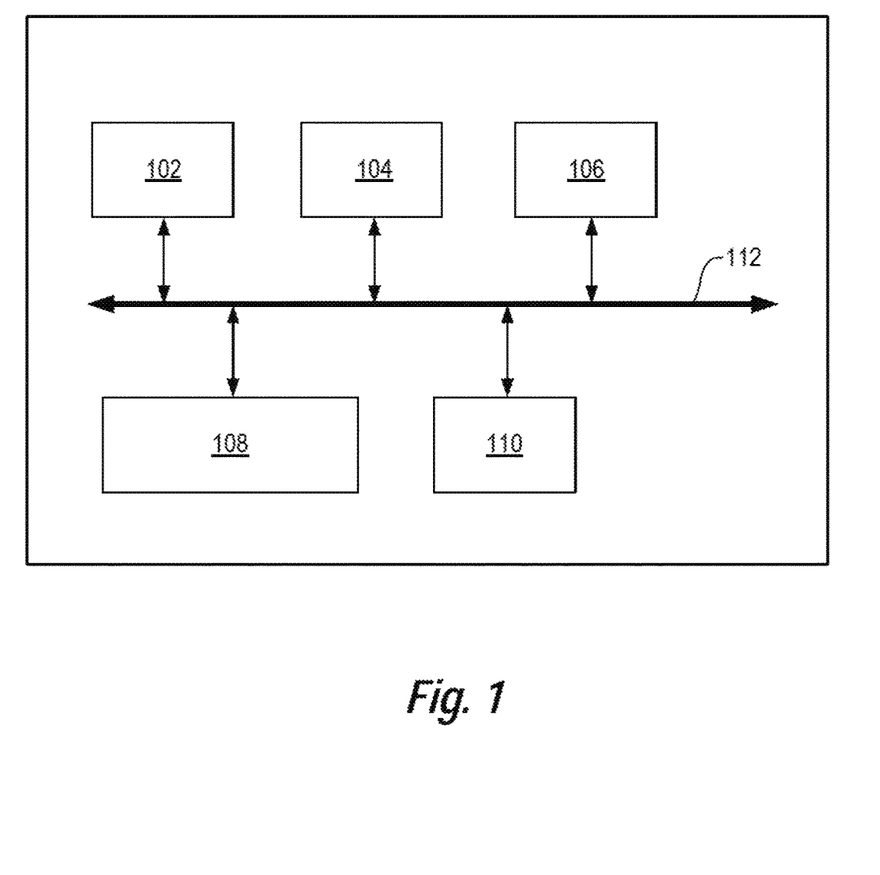
FIG. 1 is a block diagram of an example printer.

FIG. 1 is a block diagram of an example printer. Printer comprises a processor 102, memory 104, input/output (I/O) module 106, print engine 108 and controller 110 all coupled together on bus 112. In some examples printer may also have a display, a user interface module, an input device, and the like, but these items are not shown for clarity. Processor 102 may comprise a central processing unit (CPU), a microprocessor, an application specific integrated circuit (ASIC), or a combination of these devices. Memory 104 may comprise volatile memory, non-volatile memory, and a storage device. Memory 104 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 106 is used to couple printer to other devices, for example the Internet or a computer. Print engine 108 may comprise a media supply system, one or more printheads, an optical sensor system to measure ink ejected by the printheads, an ink supply system, and the like. Printer has code, typically called firmware, stored in the memory 104. The firmware is stored as computer readable instructions in the non-transitory computer readable medium (i.e. the memory 104). Processor 102 generally retrieves and executes the instructions stored in the non-transitory computer-readable medium to operate the printer. In one example, processor executes code that directs controller 110 to test the printheads.

Figure 2:
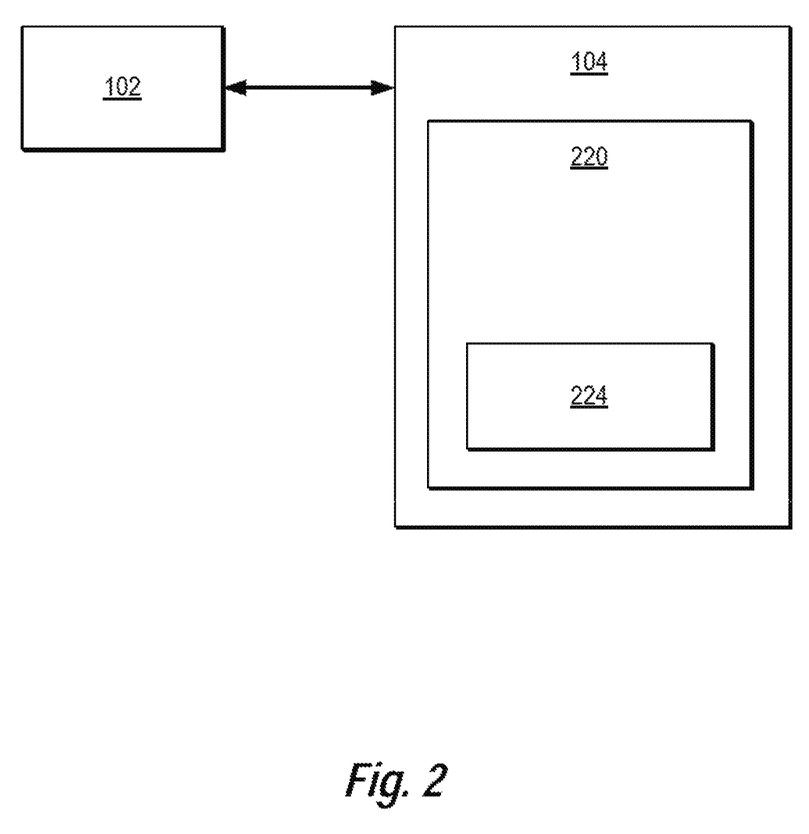
FIG. 2 is an example block diagram of the processor 102 coupled to memory 104.

FIG. 2 is an example block diagram of the processor 102 coupled to memory 104. Memory 104 contains firmware 220. Firmware 220 contains a printhead test module 224. The processor 102 executes the code in printhead test module 224 to direct controller 110 to test the printhead. In one example, the printhead test module causes the printer to check each nozzle in the printheads to determine if ink drops are ejected from the nozzle in the proper trajectory.

Figure 3:
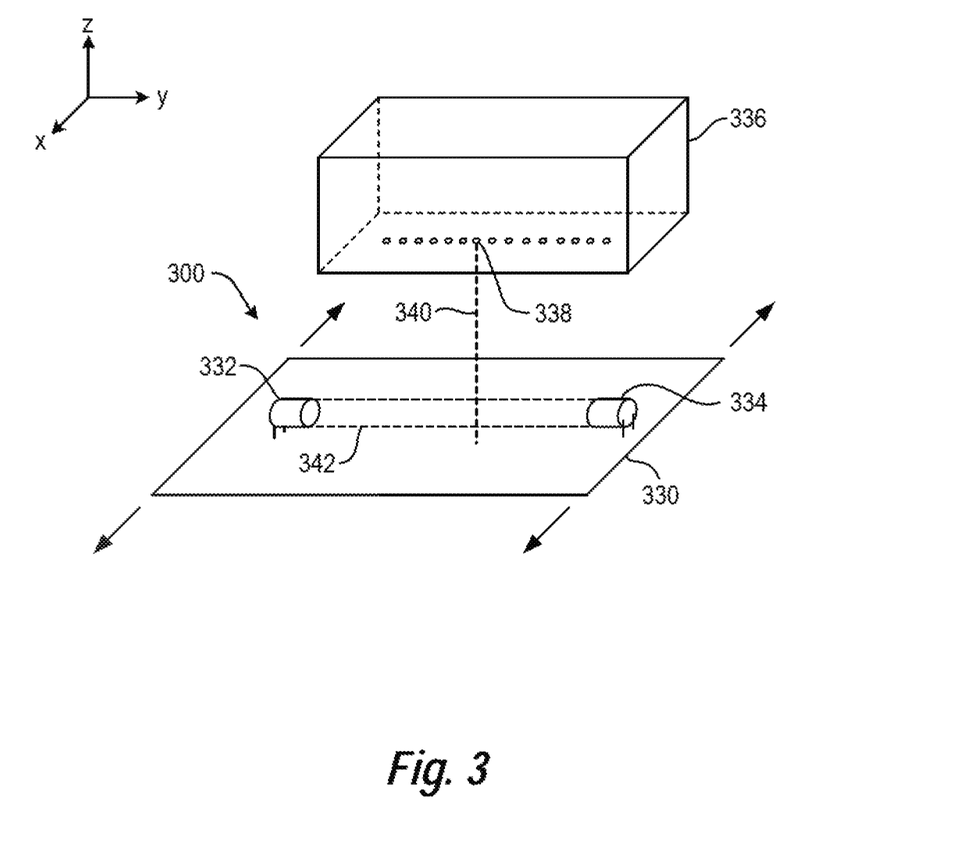
FIG. 3 is an isometric view of an example optical sensor system 300.

FIG. 3 is an isometric view of an example optical sensor system 300. Optical sensor system 300 comprises a movable carriage 330, a light emitter 332, a light detector 334, and a printhead 336. The light emitter 332 and light detector 334 are mounted on the carriage and aligned such that the beam of light 342 emitted from light emitter 332 is received by light detector 334. In some examples the light beam 342 may have a circular cross section. In other examples the light beam may have an oval or oblong cross section. Carriage 330 moves along the X-axis underneath printhead 336. In some examples the direction the carriage moves corresponds to the direction the paper moves during printing. In other examples the carriage moves in a direction perpendicular to the direction the paper moves during printing. The relative position of the carriage with respect to the printhead may be determined by a linear or angular sensor coupled to the carriage motion system or may be determined using motor control information.

Printhead 336 comprises a plurality of nozzles. Nozzle 338 is shown ejecting a stream of ink drops 340. The nozzles in FIG. 3 are shown spaced apart by a large distance for clarity. In actual practice there may be as many as 1200 nozzles per inch along the printhead and there may be multiple rows of nozzles. Printhead 336 is typically coupled to a printer using a printhead mount (not shown) that locates the printhead in the printer. In some examples there may be multiple printheads mounted in a printer. The printhead may be permanently mounted in the printed by the printhead mount, or may be replaceable.

As carriage moves underneath printhead 336 the stream of ink drops 340 intersect with light beam 342. When the stream of ink drops 340 intersect with light beam 342 the amount of light received by light detector 334 changes. The change in the signal from light detector 334 can be used to determine if the stream of ink drops 340 travel straight down (along the Z-axis) or if the stream of ink drops 340 travel at some angle with respect to the Z-axis.

Figure 4:
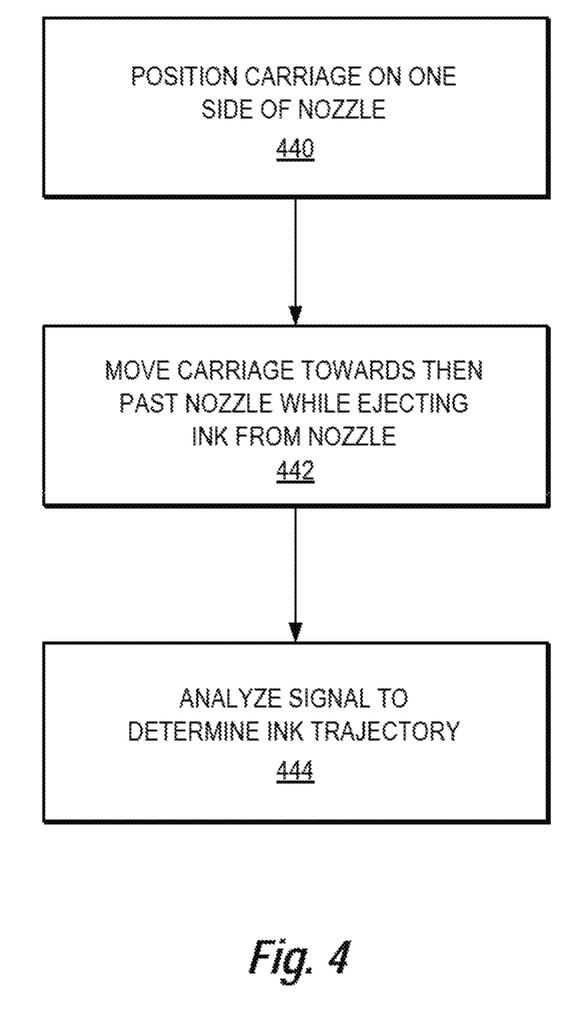
FIG. 4 is a flow chart for an example method of testing a printhead.

FIG. 4 is a flow chart for an example method of testing a printhead. At step 440 the carriage is positioned such that the beam of light 342 is on one side of a nozzle to be checked such that ink ejected by the nozzle will not intersect with the beam of light 342. At step 442 the carriage is moved towards the nozzle while ink is ejected from the nozzle. In some examples the carriage moves at a constant speed between 10 inches per second and 0.1 inches per second, for example 1 inch per second. In one example the beam is between 0.05 and 1 inch in diameter, for example 0.1 inch in diameter. The carriage will be moved until the light beam 342 is on the other side of the nozzle to be checked such that ink ejected by the nozzle will not intersect with the beam of light 342.

In one example a continuous stream of ink drops is ejected from the nozzle while the carriage is moving. In other examples burst of ink drops are ejected from the nozzle. The burst may contain between 4-20 drops per burst and each drop may be ejected with between a 40 to 170 microseconds (fire frequency between 6 KHz to 24 kHz) gap between drops. In one example there is between a 100 to 2,000 microsecond space or gap between bursts. In some examples the carriage may not be moved at a constant speed. Instead the carriage may be moved by a small amount between each burst of drops. The number of drops per burst, the spacing between drops, the spacing between burst and the carriage movement rate may be varied depending of the system measurement speed, the aerosol dispersion rate, the ink color or opaqueness and the like.

At step 444 the signal from the light detector 334 is analyzed to determine if the ink ejected by the nozzle has the proper trajectory. Ink drops that travel straight down along the Z-axis from the print head (i.e. perpendicular to the printhead) have the proper trajectory. Ink drops that travel in a path that forms an angle with respect to the Z-axis have an improper trajectory. This method may be repeated for each nozzle in the printhead. When a nozzle is detected ejecting ink with an improper trajectory, the nozzle may be inactivated and replace with a different nozzle, depending on the magnitude of the improper trajectory. In some examples a nozzle may not be ejecting ink at all. This can also be determined by analyzing the signal from the light detector 334.

Figure 5A:
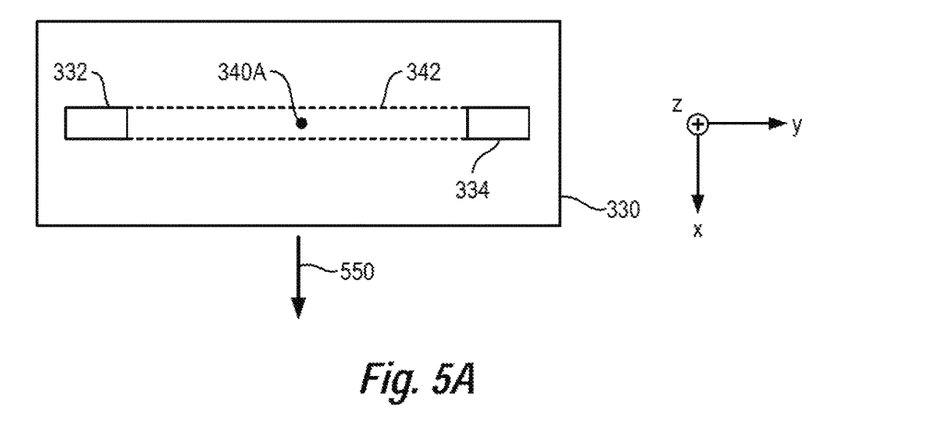
FIG. 5A is an example top view of light beam 342 with ink drops 340A having a proper trajectory.

FIG. 5A is an example top view of light beam 342 with ink drops 340A having a proper trajectory. FIG. 5A shows carriage 330 with light emitter 332 and light detector 334 mounted on the carriage 330. Carriage is moving in the X-axis as shown by arrow 550. Ink drops 340A have a trajectory perpendicular to the printhead (see FIG. 3) and parallel with the Z-axis. Ink drops 340A are shown in a position in the middle of light beam 342 at a time $T_m$ in the middle of the printhead test. The size of the ink drops has been increased dramatically for clarity.

Figure 5B:
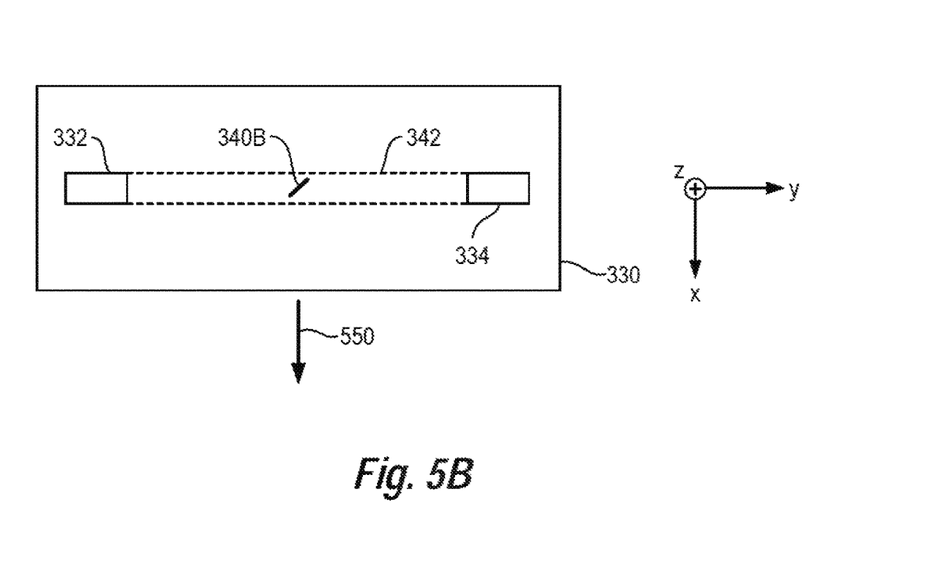
FIG. 5B is an example top view of light beam 342 with ink drops 340B having an improper trajectory.

FIG. 5B is an example top view of light beam 342 with ink drops 340B having an improper trajectory. The ink drops in FIG. 5A travel in a trajectory that is not perpendicular to the printhead. The trajectory is not parallel with the Z-axis, but makes an angle with the Z-axis. The ink drops in FIG. 5B are offset in both the X-axis and the Y-axis. Only the offset in the X-axis can be determined by looking at the output of the light sensor 334. The offset in the Y-axis cannot be detected by the signal from the light sensor 334.

Figure 6A:
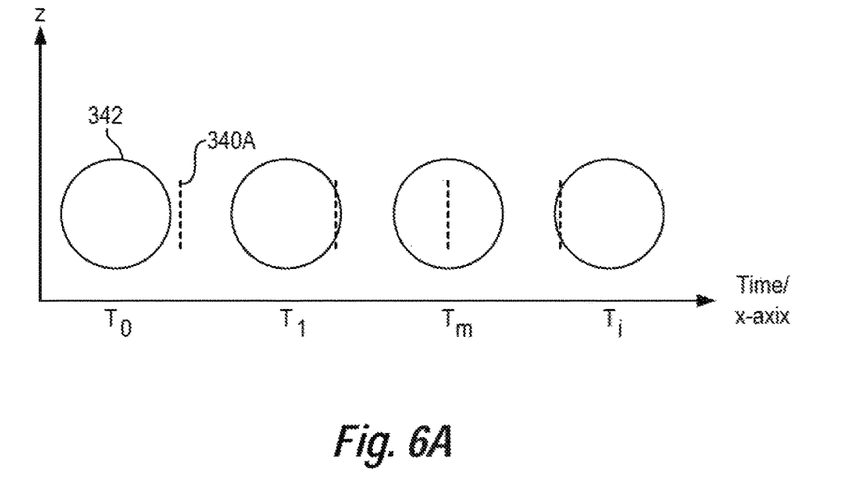
FIG. 6A is an example cross section of the light beam in FIG. 5A at different times during the printhead test.

FIG. 6A is an example cross section of the light beam in FIG. 5A at different times during the printhead test. The vertical axis corresponds to the Z-axis in FIG. 5A. The horizontal axis corresponds to the X-axis in FIG. 5A at different times during a printhead test. At time $T_0$ the light beam 342 is positioned to the left of the burst of ink drops 340A. At time $T_1$ the light beam has moved to the right such that the burst of ink drops just intersect with the right or leading edge of the light beam. At time $T_m$ the burst of ink drops pass through the middle of the light beam. Time $T_m$ corresponds to the time shown in FIG. 5A when the ink drops pass through the middle of the light beam. At time Ti the light beam has moved until the burst of ink drops just intersect the left or trailing edge of the light beam.

Figure 6B:
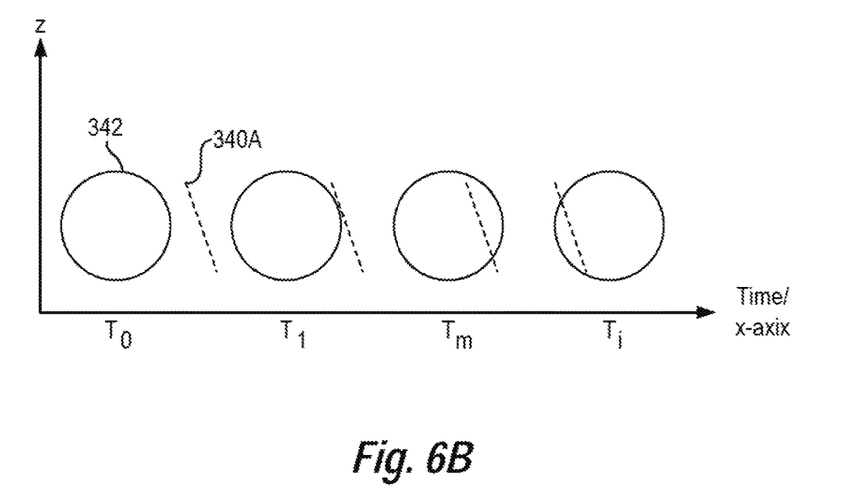
FIG. 6B is an example cross section of the light beam in FIG. 5B at different times during the printhead test.

FIG. 6B is an example cross section of the light beam in FIG. 5B at different times during the printhead test. The vertical axis corresponds to the Z-axis in FIG. 5B. The horizontal axis corresponds to the X-axis in FIG. 5B at different times during the printhead test. The ink drops in FIG. 6B do not follow a trajectory that is parallel with the Z-axis. At time $T_0$ the light beam 342 is positioned to the left of the burst of ink drops 340B. At time $T_1$ the light beam has moved to the right such that the burst of ink drops should be intersecting with the right or leading edge of the light beam. But because the trajectory of the ink drops is angled away from the light beam, the ink drops do not yet intersect with the leading edge of the light beam. At time $T_m$ the burst of ink drops should pass through the middle of the light beam. In this example the ink drops do pass through the light beam, but don't pass through the middle of the light beam. At time Ti the light beam has moved until the burst of ink drops just should just intersect the left or trailing edge of the light beam. Because the trajectory of the ink drops is angled towards the direction of carriage motion, the ink drops still intersect with more of the light beam than it should.

The output signal from the light detector 334 is the response from consecutive bursts of ink drops intersecting with the light beam when the light beam is in different positions with respect to the nozzle. When the nozzle is firing with a proper trajectory, the signal output would be nearly the same for each light beam position. The signal will be smaller when the burst of ink drops is at either edge of the light beam but the signal pattern will be the same. When the ink trajectory is not correct, the burst of ink drops are detected at different positions of the light beam and have a different pattern.

Figure 7A:
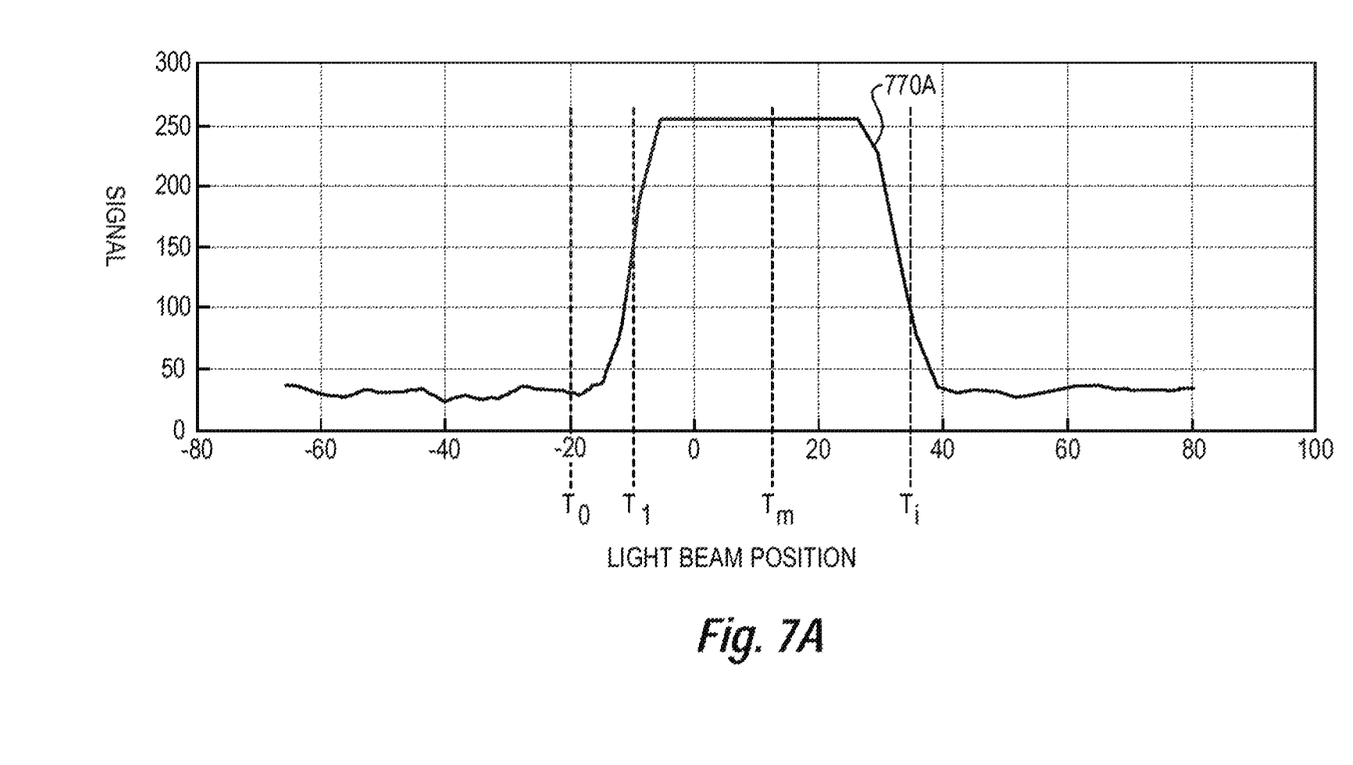
FIG. 7A is a graph of the light detector 334 output for the ink drops 340A shown in FIGS. 5A and 6A.

FIG. 7A is a graph of the light detector 334 output for the ink drops 340A shown in FIGS. 5A and 6A. The vertical axis is the signal response of the light detector 334. The horizontal axis is the position of the light beam with respect to the nozzle location at different times during the printhead test. Line 770A is the output of the light detector 334 at different times/positions during the printhead test. At time $T_0$ the light beam 342 is positioned to the left of the burst of ink drops 340A and the signal is at a low background level. At time $T_1$ the light beam has moved to the right such that the burst of ink drops just intersect with the right or leading edge of the light beam causing the signal to increase sharply. At time $T_m$ the burst of ink drops pass through the middle of the light beam where the signal has flattened out at a maximum level. At time $T_1$ the light beam has moved until the burst of ink drops just intersect the left or trailing edge of the light beam and the signal falls rapidly back to the low background level.

Figure 7B:
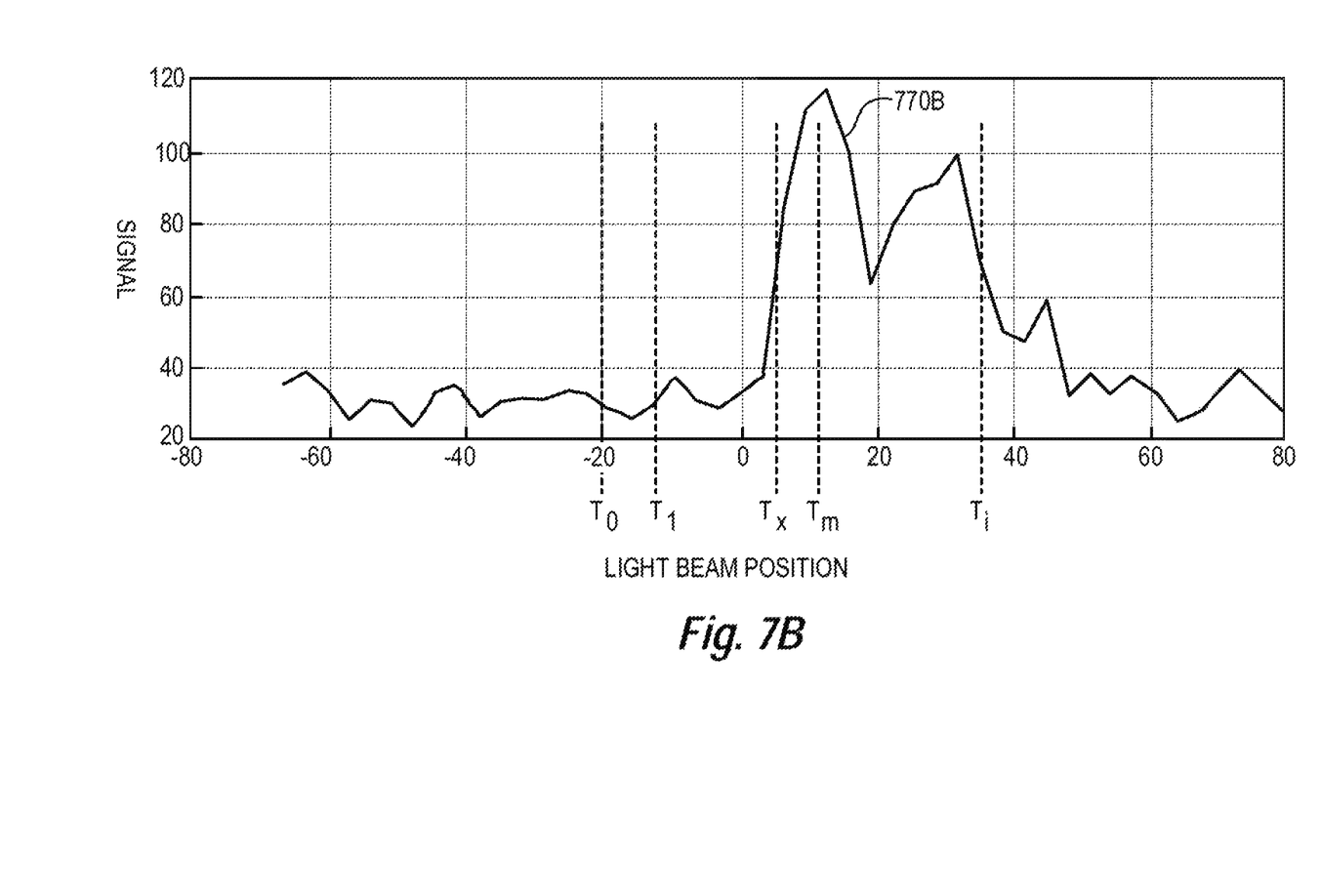
FIG. 7B is a graph of the light detector 334 output for the ink drops 340B shown in FIGS. 5B and 6B.

FIG. 7B is a graph of the light detector 334 output for the ink drops 340B shown in FIGS. 5B and 6B. The vertical axis is the signal response of the light detector 334. The horizontal axis is the position of the light beam with respect to the nozzle location at different times during the printhead test. Line 770B is the output of the light detector 334 at different times/positions during the printhead test. At time $T_0$ the light beam 342 is positioned to the left of the burst of ink drops 340B and the signal is at a low background level. At time $T_1$ the light beam has moved to the right such that the burst of ink drops should be intersecting with the right or leading edge of the light beam.

In this case because the trajectory of the ink drop is improper the signal is still at the low background level at time $T_1$ indicating that the ink drops have not yet intersected with the light beam. The signal 770B does not start increasing until time $T_x$. Therefore the ink drops do not start intersecting with the light beam until the beam has moved to a position corresponding to time $T_x$. Using the known carriage movement rate, the light beam diameter and the relative location of the carriage with respect to the nozzle under test, the offset and direction of offset in the X-axis of the ink trajectory can be estimated. At time $T_m$ the burst of ink drops should be passing through the middle of the light beam. The signal has reached a maximum level at time $T_m$ but the shape of the output curve does not have a nice flat maximum level. At time Ti the light beam should have moved until the burst of ink drops just intersect the left edge of the light beam. However because the trajectory of the ink drop is improper the signal is still high and has not started dropping back to the low background level.

Using the shape of the light detector output curve and the position when the signal increases and decreases, the trajectory of the ink drops for a given nozzle can be determined. In one example the firmware inside the printer may run the printhead tests. In other examples an external computer coupled to the printer may run the printhead test.

What is claimed is:

1. A drop ejection device comprising:
    an optical sensor mounted on a movable carriage, the optical sensor comprising a light source and a light detector, the light source to emit a light beam towards the light detector; and
    a processor coupled to memory, the memory comprising computer readable instructions to test a nozzle of a head that, when executed by the processor, cause the device to:
        move the carriage, with the optical sensor, relative to the nozzle being tested such that a width of the light beam passes under the nozzle being tested from a leading side of the beam to a trailing side of the beam;
        fire multiple bursts of multiple drops from the nozzle being tested into the light beam whilst the carriage moves the light beam underneath the nozzle being tested; and
        analyze a signal from the light detector to evaluate operation of the nozzle being tested; and
    a position sensor coupled to the carriage to determine position of the carriage relative to the head.

2. The device of claim 1, wherein the instruction, when executed, cause the carriage to move at a constant velocity.

3. The device of claim 1, wherein the instructions, when executed, cause a gap in time between the bursts of multiple drops.

4. The device of claim 1, wherein the device comprises a printhead to eject ink and the carriage moves in a direction parallel with a direction in which a print medium moves.

5. The device of claim 1, wherein the device comprises a printhead to eject ink and the carriage moves in a direction perpendicular to a direction in which a print medium moves.

6. The device of claim 1, wherein the instructions cause the processor further to determine whether drops from the nozzle being tested have a desired trajectory based on the signal from the light detector.

7. The device of claim 6, wherein the instructions cause the processor to disable the nozzle being tested when an ejected drop trajectory is improper.

8. A drop ejection device comprising:
    an optical sensor mounted on a movable carriage, the optical sensor comprising a light source and a light detector, the light source to emit a light beam towards the light detector; and
    a processor coupled to memory, the memory comprising computer readable instructions to test a nozzle of a head that, when executed by the processor, cause the device to:
        move the carriage, with the optical sensor, relative to the nozzle being tested such that a width of the light beam passes under the nozzle being tested from a leading side of the beam to a trailing side of the beam;
        fire a continuous stream of drops from the nozzle being tested into the light beam while the carriage moves the light beam underneath the nozzle being tested; and
        analyze a signal from the light detector to evaluate operation of the nozzle being tested; and
    a position sensor coupled to the carriage to determine position of the carriage relative to the head.

9. The device of claim 8, wherein the instruction, when executed, cause the carriage to move at a constant velocity.

10. The device of claim 8, wherein the device comprises a printhead to eject ink and the carriage moves in a direction parallel with a direction in which the print medium moves.

11. The device of claim 8, wherein the device comprises a printhead to eject ink and the carriage moves in a direction perpendicular to a direction in which the print medium moves.

12. The device of claim 8, wherein the processor is further to determine whether drops from the nozzle being test have a desired trajectory based on the signal from the light detector.

13. The device of claim 12, wherein the processor is to disable the nozzle being tested when an ejected drop trajectory is improper.

14. A drop ejection device comprising:
    an optical sensor mounted on a movable carriage, the optical sensor comprising a light source and a light detector, the light source to emit a light beam towards the light detector;
    a processor coupled to memory, the memory comprising computer readable instructions to test a nozzle of a head; and
    a position sensor coupled to the carriage to determine position of the carriage relative to the head;
    the instructions, when executed by the processor, cause the device to;
        move the carriage, with the optical sensor, relative to the nozzle being tested such that a width of the light beam passes under the nozzle being tested from a leading side of the beam to a trailing side of the beam;
        fire multiple bursts of multiple drops from the nozzle being tested into the light beam whilst the carriage moves the light beam underneath the nozzle being tested; and
        analyze a signal from the light detector to evaluate operation of the nozzle being tested, the evaluation comprising, based on a known carriage movement rate, width of the light beam and relative position of the carriage with respect to the nozzle being tested, estimating an offset and direction of the offset of a drop trajectory from the nozzle being tested as compared to a desired drop trajectory.

15. The device of claim 14, further comprising a position sensor coupled to the carriage to determine position of the carriage relative to the head.

16. The device of claim 14, wherein the instruction, when executed, cause the carriage to move at a constant velocity.

17. The device of claim 14, wherein the instructions, when executed, cause a gap in time between the bursts of multiple drops.

18. The device of claim 17, wherein the gap in time between the bursts of multiple drops is between 100 and 2000 microseconds.

19. The device of claim 4, wherein each burst of drops comprises 4-20 drops.

20. The device of claim 14, wherein the instructions, when executed, cause drops in a burst to be fired at a frequency between 6-24 kHz.

\* \* \* \* \*

UNITED STATES PATENT AND TRADEMARK OFFICE
CERTIFICATE OF CORRECTION

PATENT NO. : 9,776,396 B2  
APPLICATION NO. : 15/596600  
DATED : October 3, 2017  
INVENTOR(S) : Laura Portela Mata et al.

Page 1 of 1

It is certified that error appears in the above-identified patent and that said Letters Patent is hereby corrected as shown below:

In the Drawings

In sheet 6 of 8, Fig. 6A, in x-axis, Line 1, delete "x-axix" and insert -- x-axis --, therefor.

In sheet 6 of 8, Fig. 6B, in x-axis, Line 1, delete "x-axix" and insert -- x-axis --, therefor.

In the Claims

In Column 6, Line 37, in Claim 14, delete "to;" and insert -- to: --, therefor.

In Column 6, Line 66, in Claim 19, delete "4," and insert -- 14, --, therefor.

Signed and Sealed this  
Tenth Day of April, 2018

Andrei Iancu  
*Director of the United States Patent and Trademark Office*